(12) United States Patent
Li et al.

(10) Patent No.: US 9,225,209 B2
(45) Date of Patent: Dec. 29, 2015

(54) PERMANENT MAGNET ROTOR AND ELECTRIC MOTOR INCORPORATING THE ROTOR

(71) Applicant: Johnson Electric S.A., Murten (CH)

(72) Inventors: Yue Li, Hong Kong (CN); Mao Xiong Jiang, Shenzhen (CN); Jian Zhao, Shenzhen (CN); Shi Xing Huang, Shenzhen (CN); Ya Ming Zhang, Shenzhen (CN); Xiao Ning Zhu, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 269 days.

(21) Appl. No.: 13/712,951

(22) Filed: Dec. 12, 2012

(65) Prior Publication Data

US 2013/0147301 A1    Jun. 13, 2013

(30) Foreign Application Priority Data

Dec. 12, 2011  (CN) .......................... 2011 1 0412208

(51) Int. Cl.
   *H02K 1/27* (2006.01)
   *H02K 1/28* (2006.01)

(52) U.S. Cl.
   CPC ................. *H02K 1/276* (2013.01); *H02K 1/27* (2013.01); *H02K 1/274* (2013.01); *H02K 1/2713* (2013.01); *H02K 1/2773* (2013.01); *H02K 1/28* (2013.01)

(58) Field of Classification Search
   CPC ....... H02K 1/27; H02K 1/223; H02K 1/2706; H02K 1/2713; H02K 1/272; H02K 1/2726; H02K 1/2733; H02K 1/274; H02K 1/2746; H02K 1/2753; H02K 1/276; H02K 1/2766; H02K 1/2773; H02K 1/278; H02K 1/2786; H02K 1/2793; H02K 21/12; H02K 21/14
   USPC ............. 310/156.53, 156.56, 156.34, 156.35, 310/156.36, 156.37, 156.38, 156.39, 310/156.41, 156.42, 156.43, 156.44, 310/156.45, 156.46, 156.47, 156.48, 310/156.49, 156.51, 156.52, 156.54, 310/156.55, 156.57, 156.83, 156.84
   See application file for complete search history.

(56) References Cited

U.S. PATENT DOCUMENTS

| | | | |
|---|---|---|---|
| 5,117,553 A | 6/1992 | Kliman | |
| 5,159,220 A | 10/1992 | Kliman | |
| 6,031,311 A * | 2/2000 | Lee | .......................... 310/156.57 |
| 6,147,428 A | 11/2000 | Takezawa et al. | |
| 6,177,745 B1 * | 1/2001 | Narita et al. | .............. 310/156.43 |
| 6,342,745 B1 | 1/2002 | Sakai et al. | |
| 6,917,133 B2 * | 7/2005 | Koharagi et al. | ........ 310/156.57 |

(Continued)

*Primary Examiner* — Terrance Kenerly
*Assistant Examiner* — Alexander Singh
(74) *Attorney, Agent, or Firm* — Muncy, Geissler, Olds & Lowe, P.C.

(57) ABSTRACT

A permanent magnet rotor includes a shaft, a rotor core fixed to the shaft, and multiple magnet sets. The rotor core has multiple groove sets for receiving the magnet sets. Each groove set has two grooves spaced apart by a first section of the rotor core. The first section has a width gradually decreasing from a radially inner end to a radially outer end. Each groove has a width gradually increasing from a radially inner end to a radially outer end. Each magnet set includes two magnets respectively received in the grooves of a respective groove set. The magnets of a magnet set are magnetized in a same direction, and every two adjacent magnet sets are magnetized in contrary directions creating multiple magnetic poles. The number of magnetic poles is equal to the number of magnet sets.

19 Claims, 3 Drawing Sheets

(56) References Cited

U.S. PATENT DOCUMENTS

| | | |
|---|---|---|
| 6,927,519 B2 | 8/2005 | Popov |
| 6,987,341 B2 * | 1/2006 | Chang et al. ............. 310/156.45 |
| 6,987,342 B2 | 1/2006 | Hans |
| 7,405,504 B2 | 7/2008 | Arimitsu et al. |
| 7,868,501 B2 * | 1/2011 | Jonasson et al. ......... 310/156.53 |
| 2002/0047435 A1 * | 4/2002 | Takahashi et al. ....... 310/156.56 |
| 2006/0017345 A1 * | 1/2006 | Uchida et al. ............ 310/156.56 |
| 2009/0322175 A1 * | 12/2009 | Kori et al. ................ 310/156.41 |

* cited by examiner

PERMANENT MAGNET ROTOR AND ELECTRIC MOTOR INCORPORATING THE ROTOR

CROSS REFERENCE TO RELATED APPLICATIONS

This non-provisional patent application claims priority under 35 U.S.C. §119(a) from Patent Application No. 201110412208.0 filed in The People's Republic of China on Dec. 12, 2011.

FIELD OF THE INVENTION

This invention relates to a permanent magnet rotor and in particular, to a permanent magnet rotor having high magnetic concentration and to an electric motor having the permanent magnet rotor.

BACKGROUND OF THE INVENTION

In an electric motor having a wound stator and a permanent magnet rotor, the stator windings, when electrified, generate a rotating magnetic field which causes the rotor to rotate. In a so called IPM (internal permanent magnet) rotor, a plurality of permanent magnets are embedded in a rotor core. The permanent magnets are separate and each form a N pole or S pole of the rotor, wherein the N pole magnets and the S pole magnets are alternately arranged in the circumferential direction of the rotor core. However, this type of rotor has a low magnetic concentration which results in a motor with a low power density.

Therefore, there is a desire for an improved permanent magnet rotor that can overcome the above described shortcomings

SUMMARY OF THE INVENTION

Accordingly, in one aspect thereof, the present invention provides a permanent magnet rotor comprising: a shaft; a rotor core fixed to the shaft, the rotor core defining a plurality of groove sets, each groove set comprising two grooves which are spaced with a first section of the rotor core located there between, the first section having a width measured in a circumferential direction of the rotor core gradually decreasing from a radially inner end to a radially outer end, each groove having a width measured in the circumferential direction of the rotor core gradually increasing from a radially inner end to a radially outer end; and a plurality of magnet sets, each magnet set comprising two magnets respectively received in the two grooves of a respective groove set, the two magnets of a magnet set are magnetized in a same direction, every two adjacent magnet sets are magnetized in contrary directions to thereby form a plurality of magnetic poles of the rotor, and the number of the magnetic poles of the rotor is equal to the number of magnet sets.

Preferably, each two adjacent groove sets are spaced with a second section of the rotor core located there between, and the second section has a width measured in the circumferential direction of the rotor core gradually increasing from a radially inner end to a radially outer end.

Preferably, the second section of the rotor core has a minimum width of not more than 1 millimeter.

Preferably, the first section of the rotor core has a minimum width of not more than 1 millimeter.

Preferably, the number of magnet sets is 8, and the magnet sets form 8 magnetic poles of the rotor.

According to a second aspect thereof, the present invention provides a permanent magnet rotor comprising: a shaft; a rotor core fixed to the shaft; and a plurality of magnet sets embedded in the rotor core, each magnet set comprising two magnets, each magnet having a width measured in a circumferential direction of the rotor gradually increasing from a radially inner end to a radially outer end, the two magnets of a magnet set being spaced with a first section of the rotor core located there between, the first section of the rotor core having a width measured in the circumferential direction of the rotor gradually decreasing from a radially inner end to a radially outer end, each two adjacent magnet sets being spaced with a second section of the rotor core located there between, confronting faces of the magnets located at two sides of the first section of the rotor core being of contrary polarities, and confronting faces of the magnets located at two sides of the second section of the rotor core being of the same polarity, such that the rotor has a plurality of magnetic poles of a number equal to the number of magnet sets.

Preferably, the first section of the rotor core has a minimum width of not more than 1 millimeter.

Preferably, the second section has a width measured in the circumferential direction of the rotor core gradually increasing from a radially inner end to a radially outer end.

Preferably, the second section of the rotor core has a minimum width of not more than 1 millimeter.

Preferably, the number of magnet sets is 8, and the magnet sets form 8 rotor poles.

According to other aspects thereof, the present invention provides an electric motor comprising: a stator; and a rotor according to the first or second aspects.

Preferably, the first section of the rotor core has a minimum width of not more than 1 millimeter.

Preferably, the second section has a width measured in the circumferential direction of the rotor core gradually increasing from a radially inner end to a radially outer end.

Preferably, the second section of the rotor core has a minimum width of not more than 1 millimeter.

Preferably, the number of magnet sets is 8, and the magnet sets form 8 rotor poles.

Preferably, each two adjacent groove sets are spaced with a second section of the rotor core located there between, and the second section has a width measured in the circumferential direction of the rotor core gradually increasing from a radially inner end to a radially outer end.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
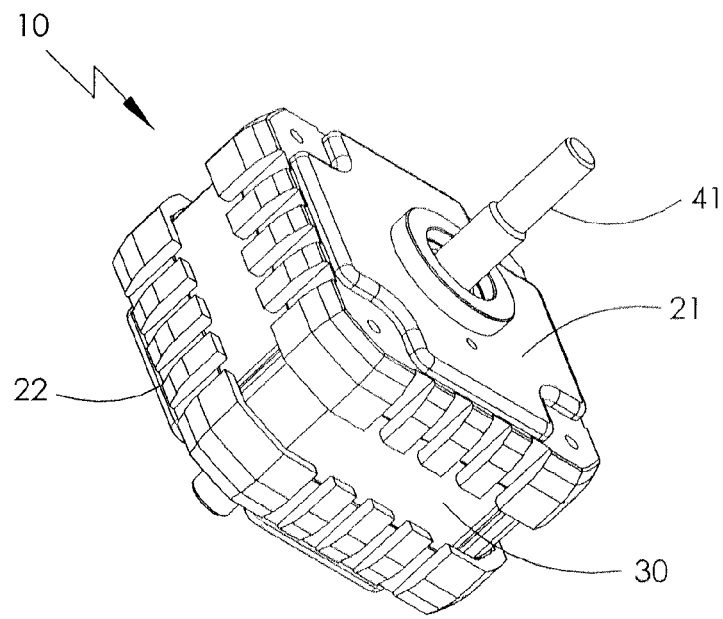
FIG. 1 is an isometric view of an electric motor according to the preferred embodiment of the present invention.
Figure 2:
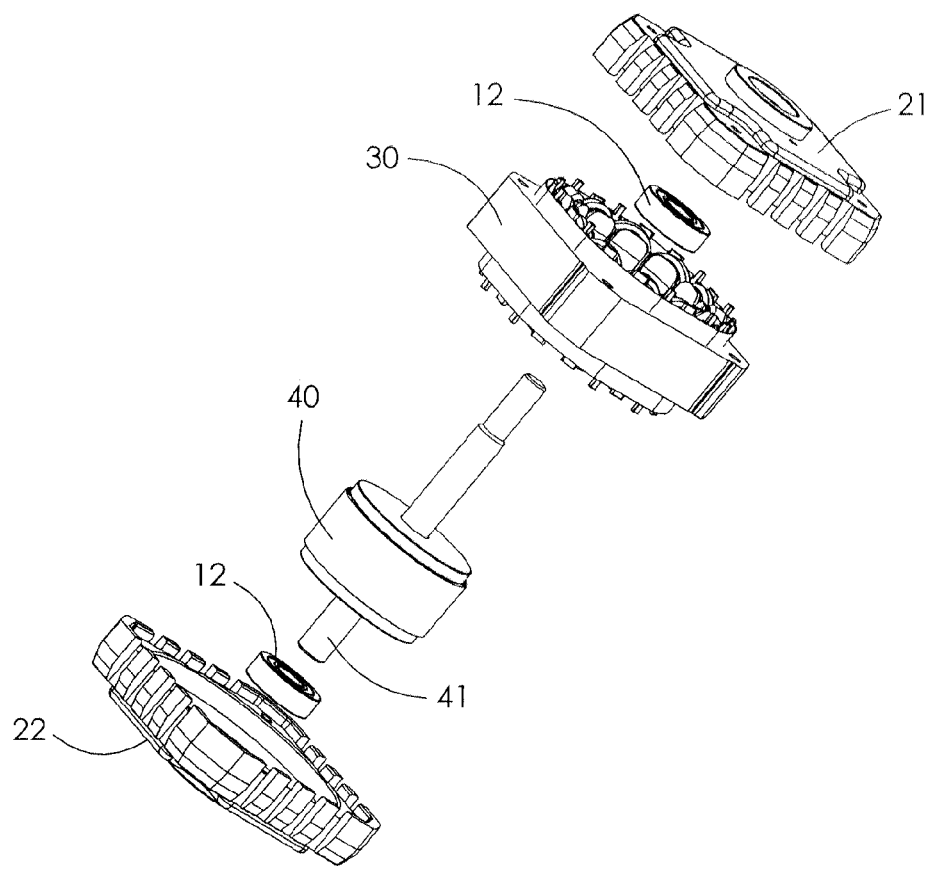
FIG. 2 is an exploded view of the motor of FIG. 1.
Figure 3:
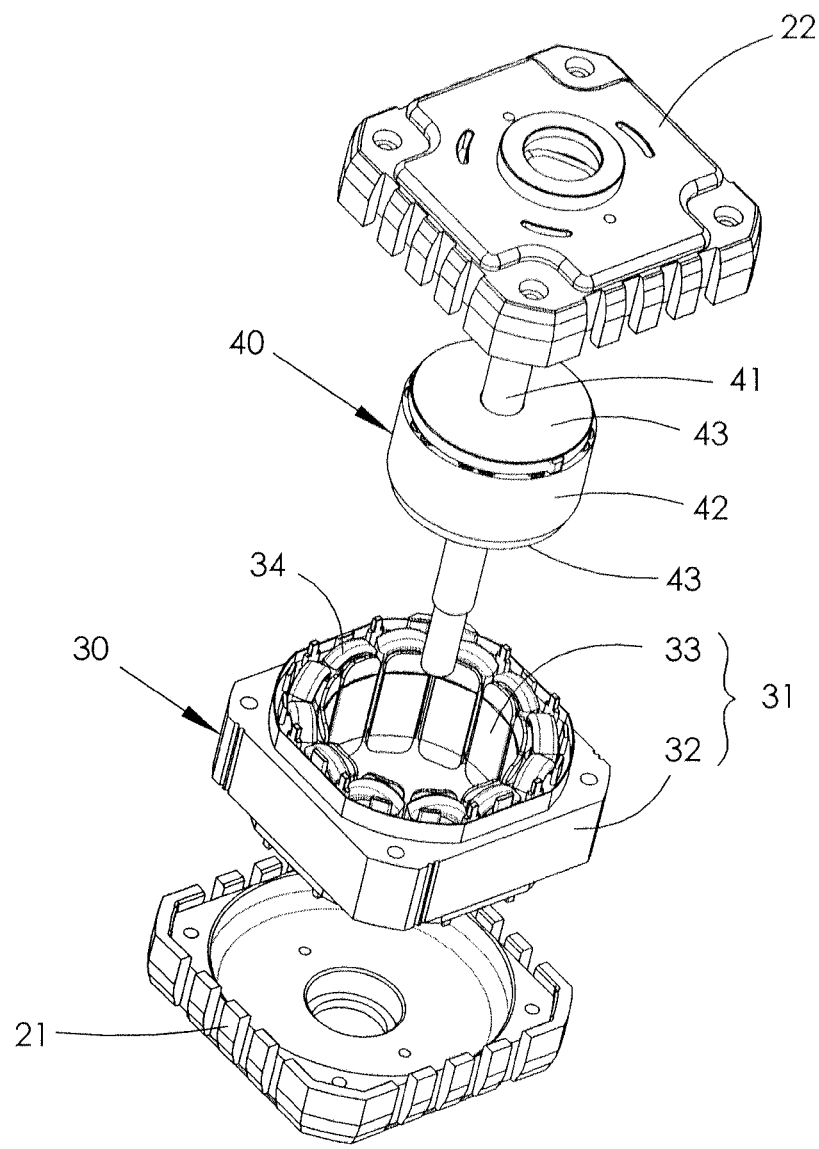
FIG. 3 is an exploded view of the motor of FIG. 1, viewed from below.

Referring to FIGS. 1 to 3, an electric motor 10 according to the preferred embodiment of the present invention is shown, as an exemplary example. The motor may be used in clothes washing machines or tumble dryers. The motor 10 includes a stator 30, a rotor 40 and two end caps 21, 22. The rotor 40 is rotatably disposed in the stator 30, and the end caps 21, 22 are fixed to respective axial ends of the stator 30 and support the rotor 40 through bearings 12. The rotor 40 includes a shaft 41, axial ends of which are supported by bearings 12 mounted in the end caps 21, 22, such that the rotor is able to rotate with respect to the stator.

The stator 30 includes a stator core 31 and windings 34 wound on the stator core 31. The stator core 31 includes a yoke 32 and a plurality teeth 33 extending inwardly from the yoke. Windings 34 are formed by a plurality of coils wound about the teeth. In this embodiment, the stator 30 includes 12 teeth 33 and 12 coils respectively wound on the teeth 33, forming 12 stator poles. The winding is of the type commonly known as a concentrated winding with one coil per tooth and one tooth per coil.

Figure 4:
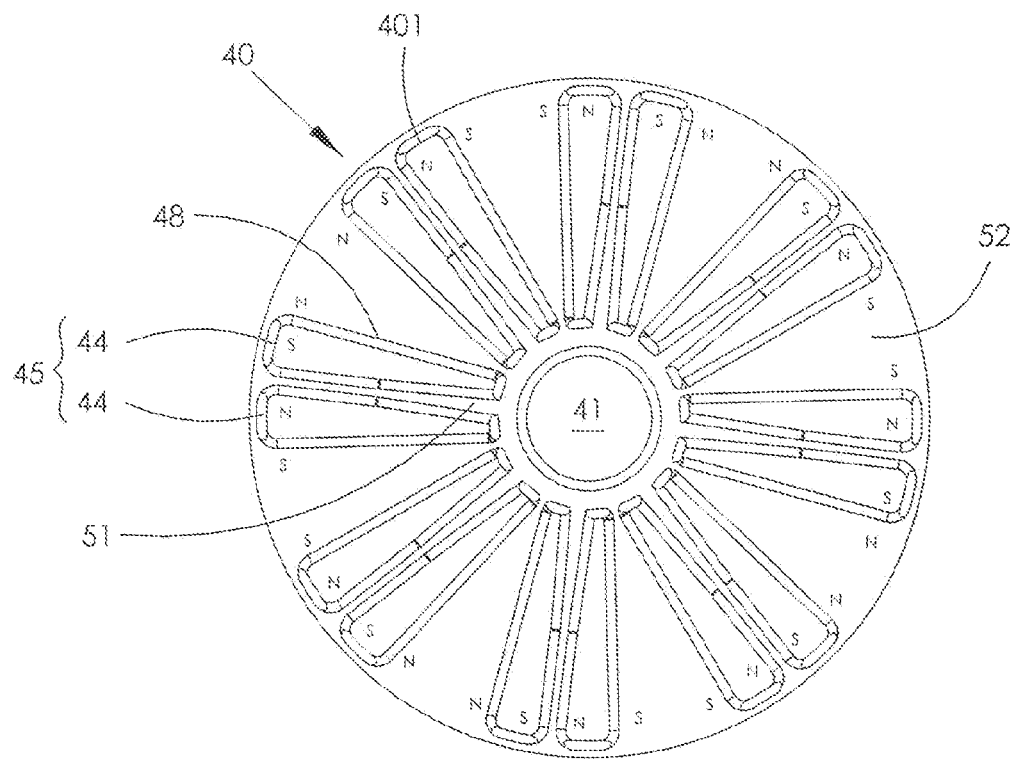
FIG. 4 is a plan view of a rotor of the electric motor of FIG. 1, with balance plates of the rotor removed.
Figure 5:
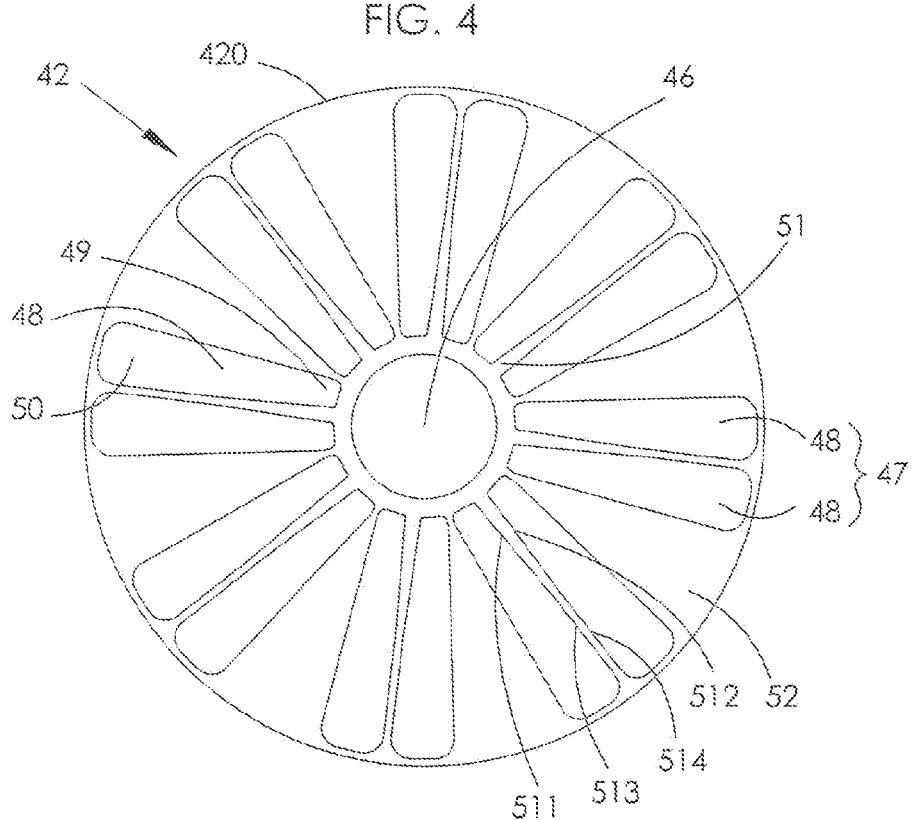
FIG. 5 is a plan view of the rotor core of the rotor of FIG. 4.

Referring also to FIGS. 4 and 5, the rotor 40 also includes a rotor core 42 mounted on the shaft 41, preferably by a press fit arrangement. A plurality of permanent magnet sets 45 are embedded in the rotor core 42. Two balance plates 43 are mounted on the shaft 41 and located at respective axial ends of the rotor core 42.

The rotor core 42, in this embodiment, is formed by stamping and stacking a plurality of laminations which may be held together by suitable means, such as interlocking or welding. The rotor core 42 is substantially cylindrical with a fixing hole 46 defined in a central area thereof and arranged to be a press fit with the shaft 41. The rotor core 42 further defines a plurality of groove sets 47 around the fixing hole 46 for receiving the magnet sets 45. The groove sets 47 are substantially equidistantly spaced in a circumferential direction of the rotor core 42. Each groove set 47 includes two separate grooves 48 located adjacent to each other. Each groove 48 is a hole that extends axially through the rotor core 42, and is substantially trapezoidal in shape in a transverse section of the rotor core 42, with a width measured in the circumferential direction of the rotor core 42 gradually increasing from a radially inner end 49 to a radially outer end 50. The radially inner end 49 of the groove 48 is spaced from the fixing hole 46, and the radially outer end 50 of the groove 48 is spaced from a radially outer surface of the rotor core 42. Thus, the groove 48 has an enclosed edge in the transverse section of the rotor core 42.

The grooves 48 of each groove set 47 are spaced with a first section 51 of the rotor core 42 located there between. Each first section 51 has a width measured in the circumferential direction of the rotor core that gradually decreases from a radially inner end corresponding to the radially inner ends 49 of the grooves 48 to a radially outer end corresponding to the radially outer ends 50 of the grooves 48. The first section 51 has a maximum width at the radially inner end, increasing the mechanical strength of the rotor core 42, and this is thought to have little negative effect on the magnetic flux leakage of the rotor 40. The first section 51 has a minimum width at the radially outer end, which can significantly reduce the magnetic flux leakage of the rotor 40. Preferably the minimum width of the first section 51 is not more than 1 millimeter, and in this embodiment, it is 0.6 millimeter. Each first section 51 includes two opposite sides 511 and 512. Portions 513 and 514 of the two sides 511 and 512 adjacent to the radically outer end 50 are parallel to each other. In one embodiment, a distance between one end of the radially outer end 50 of the groove and an edge 420 of the rotor core 42 is substantially equal to a distance between another end of the radially outer end 50 of the groove and the edge 420 of the rotor core 42.

The groove sets 47 are spaced with a second section 52 of the rotor core 42 located between each two neighboring groove sets 47. Each second section 52 has a width measured in the circumferential direction of the rotor core 42 that gradually increases from a radially inner end corresponding to the radially inner end 49 of the grooves 48 to a radially outer end corresponding to the radially outer end 50 of the grooves 48. Therefore, the second section 52 has a minimum width at the radially inner end. Preferably, the minimum width of the second section 52 is not more than 1 millimeter, and in this embodiment, it is 0.7 millimeter.

Each of the magnet sets 45 includes two magnets 44 respectively received in the two grooves 48 of a corresponding groove set 47. Each magnet 44 has a shape and size matching a respective groove 48, such that each magnet 44 has a trapezoidal shape in the transverse section of the rotor 40. Each magnet 44 has a thickness, measured in the circumferential direction of the rotor 40, gradually increasing from a radially inner end to a radially outer end. In this embodiment, the rotor 40 includes 8 magnet sets 45 and 8 groove sets 47 for receiving the magnet sets 45, correspondingly. Each magnet 44 comprises a radially outer end 401. In one embodiment, a distance between one end of the radially outer end 401 of the magnet 44 and an edge 420 of the rotor core 42 is substantially equal to a distance between another end of the radially outer end 420 of the magnet 44 and the edge 420 of the rotor core 42.

Each magnet 44 is magnetized in the thickness direction, i.e., in the circumferential direction of the rotor 40. The magnetized direction of the two magnets 44 of a magnet set 45 are the same, thus the faces of the two magnets 44 confronting each other, i.e., the faces of the magnets 44 located at two sides of the first section 51 of the rotor core 42, are of contrary polarities. The magnetized directions of every two adjacent magnet sets 45 are contrary to each other, thus the faces of the magnets 44 which are located at two sides of the second section 52 of the rotor core 42 are of the same polarity, as shown in FIG. 4, i.e., they may be all North poles as indicated by N to form a North pole of the rotor 40 or all South poles as indicated by S to form a South pole of the rotor 40. Therefore, the rotor 40 has 8 magnetic poles, 4 North poles and 4 South poles, which are alternately arranged in the circumferential direction of the rotor 40.

Since each of the magnet sets 45 includes two separate magnets 44 magnetized in a same direction, the rotor has increased magnetic concentration and reduced magnetic flux leakage.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A permanent magnet rotor comprising:
   a shaft;
   a rotor core fixed to the shaft, the rotor core defining a plurality of groove sets, each groove set comprising two grooves which are spaced with a first section of the rotor core located there between, the first section of the rotor core being continuous, the first section having a width measured in a circumferential direction of the rotor core gradually decreasing from a radially inner end to a radially outer end, each groove having a width measured in the circumferential direction of the rotor core gradually increasing from a radially inner end to a radially outer end; and
   each first section comprising two opposite sides, portions of the two sides adjacent to a radially outer end being parallel to each other;
   a plurality of magnet sets, each magnet set comprising two magnets respectively received in the two grooves of a respective groove set, each magnet comprising a plurality of magnet portions locate around a border of the groove in which it is received, with an open center formed between the magnet portions, the two magnets of a magnet set are magnetized in a same direction, every two adjacent magnet sets are magnetized in contrary directions to thereby form a plurality of magnetic poles of the rotor, and the number of the magnetic poles of the rotor is equal to the number of magnet sets.

2. The permanent magnet rotor of claim 1, wherein each two adjacent groove sets are spaced with a second section of the rotor core located there between, and the second section has a width measured in the circumferential direction of the rotor core gradually increasing from a radially inner end to the radially outer end.

3. The permanent magnet rotor of claim 2, wherein the second section of the rotor core has a minimum width of not more than 1 millimeter.

4. The permanent magnet rotor of claim 1, wherein the first section of the rotor core has a minimum width of not more than 1 millimeter.

5. The permanent magnet rotor of claim 1, wherein the number of magnet sets is 8, and the magnet sets form 8 magnetic poles of the rotor.

6. An electric motor comprising: a stator; and a rotor according to claim 1.

7. The permanent magnet rotor of claim 1, wherein a distance between one end of the radially outer end of the groove and an edge of the rotor core is substantially equal to a distance between another end of the radially outer end of the groove and the edge of the rotor core.

8. A permanent magnet rotor comprising:
   a shaft;
   a rotor core fixed to the shaft; and
   a plurality of magnet sets embedded in the rotor core, each magnet set comprising two magnets, each magnet comprising a plurality of magnet portions forming a border with an open center between magnetic portions, each magnet having a width measured in a circumferential direction of the rotor gradually increasing from a radially inner end to a radially outer end, the two magnets of a magnet set being spaced with a first section of the rotor core located there between, the first section of the rotor core being continuous, the first section of the rotor core having a width measured in the circumferential direction of the rotor gradually decreasing from a radially inner end to a radially outer end, each two adjacent magnet sets being spaced with a second section of the rotor core located there between, confronting faces of the magnets located at two sides of the first section of the rotor core being of contrary polarities, and confronting faces of the magnets located at two sides of the second section of the rotor core being of the same polarity, such that the rotor has a plurality of magnetic poles of a number equal to the number of magnet sets, wherein each first section comprises two opposite sides, portions of the two sides adjacent to a radially outer end are parallel to each other.

9. The permanent magnet rotor of claim 8, wherein the first section of the rotor core has a minimum width of not more than 1 millimeter.

10. The permanent magnet rotor of claim 8, wherein the second section has a width measured in the circumferential direction of the rotor core gradually increasing from a radially inner end to a radially outer end.

11. The permanent magnet rotor of claim 10, wherein the second section of the rotor core has a minimum width of not more than 1 millimeter.

12. The permanent magnet rotor of claim 8, wherein the number of magnet sets is 8, and the magnet sets form 8 rotor poles.

13. An electric motor comprising: a stator; and a rotor according to claim 8.

14. The electric motor of claim 13, wherein the first section of the rotor core has a minimum width of not more than 1 millimeter.

15. The electric motor of claim 13, wherein the second section has a width measured in the circumferential direction of the rotor core gradually increasing from a radially inner end to a radially outer end.

16. The electric motor of claim 15, wherein the second section of the rotor core has a minimum width of not more than 1 millimeter.

17. The electric motor of claim 13, wherein the number of magnet sets is 8, and the magnet sets form 8 rotor poles.

18. The electric motor of claim 13, wherein each two adjacent groove sets are spaced with a second section of the rotor core located there between, and the second section has a width measured in the circumferential direction of the rotor core gradually increasing from a radially inner end to a radially outer end.

19. The permanent magnet rotor of claim 8, wherein each magnet comprises a radially outer end, a distance between one end of the radially outer end of the magnet and an edge of the rotor core is substantially equal to a distance between another end of the radially outer end of the magnet and the edge of the rotor core.

* * * * *